United States Patent [19]

Bowman, Jr. et al.

[11] 4,200,165
[45] Apr. 29, 1980

[54] INTEGRAL SWING ARM

[75] Inventors: Miles A. Bowman, Jr.; Jack A. Schaeffer, both of Reading, Pa.

[73] Assignee: Dana Corporation, Toledo, Ohio

[21] Appl. No.: 951,494

[22] Filed: Oct. 16, 1978

Related U.S. Application Data

[63] Continuation of Ser. No. 921,241, Jul. 3, 1978, abandoned.

[51] Int. Cl.² .............................................. B60K 17/30
[52] U.S. Cl. .................................. 180/253; 180/73 C
[58] Field of Search ................... 180/43 R, 44 R, 6.48, 180/73 R, 73 C; 280/666, 696

[56] References Cited

U.S. PATENT DOCUMENTS

| 3,887,211 | 6/1975 | Mazur | 280/95 R |
|---|---|---|---|
| 3,948,337 | 4/1976 | Richardson et al. | 180/43 R |

*Primary Examiner*—Robert R. Song
*Assistant Examiner*—Donn McGiehan
*Attorney, Agent, or Firm*—Oliver E. Todd, Jr.; Robert M. Leonardi

[57] ABSTRACT

The present invention relates to an improved independent suspension system for vehicle wheels which may be used either for driven or non-driven wheels including dirigible wheels of a vehicle having front wheel drive. One of the independently suspended driven wheels is mounted on an end of a transversely extending stamped metal suspension arm pivoted about the other end for movement relative to a point on the vehicle chassis. The other driven wheel is mounted on a second transversely extending stamped metal suspension arm which also is pivoted for movement relative to a point on the vehicle chassis. The second arm mounts a differential which is connected through axle shafts to drive the wheels.

13 Claims, 12 Drawing Figures

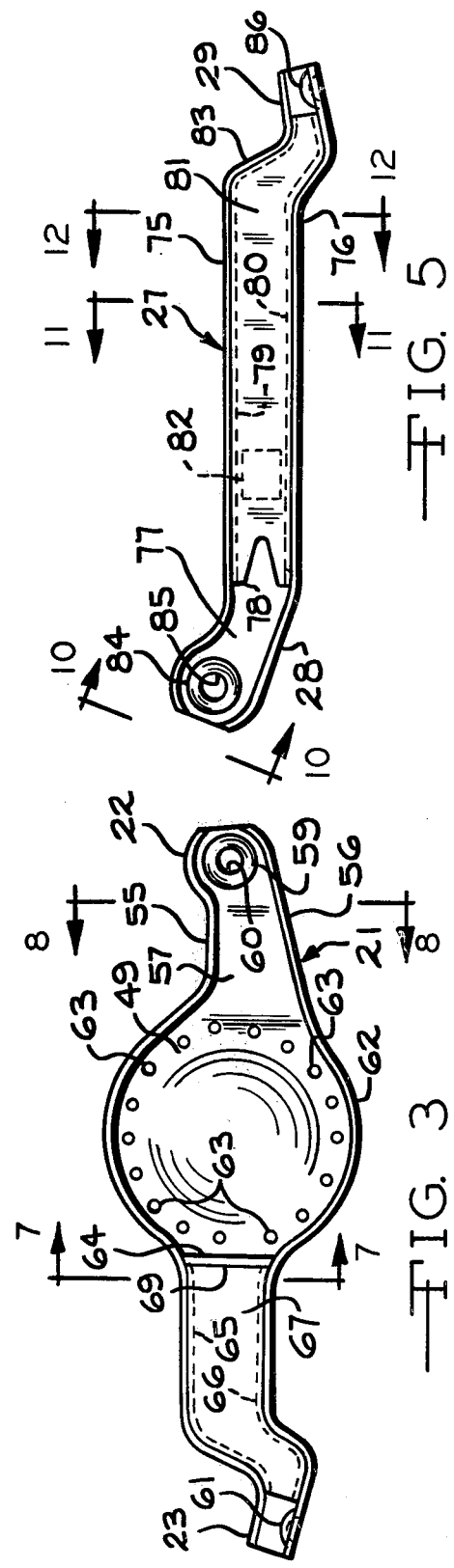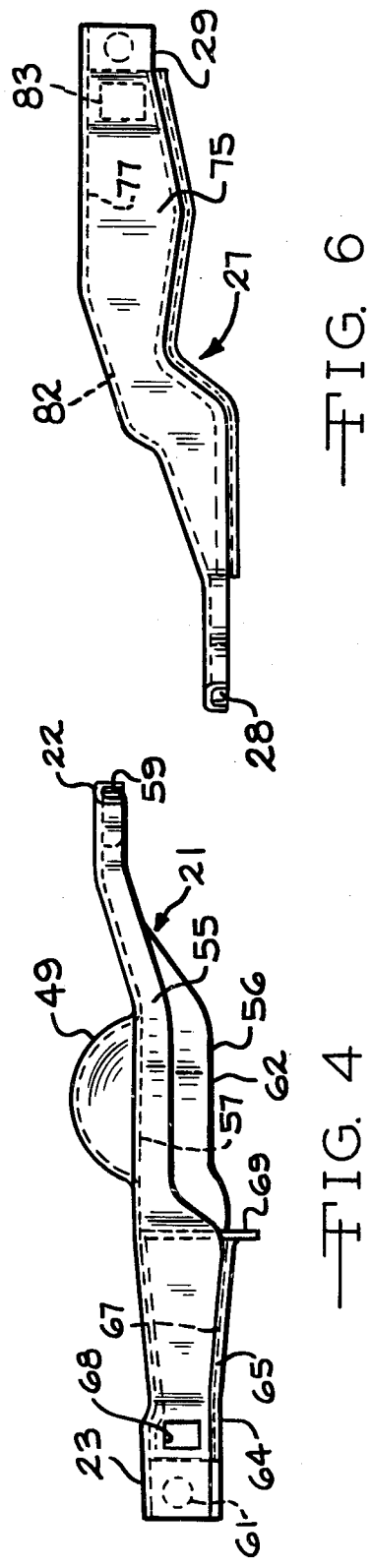

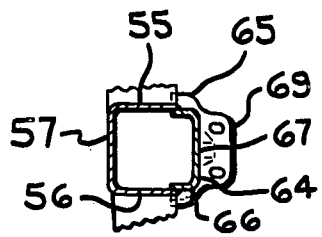
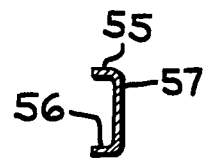
FIG. 7   FIG. 8
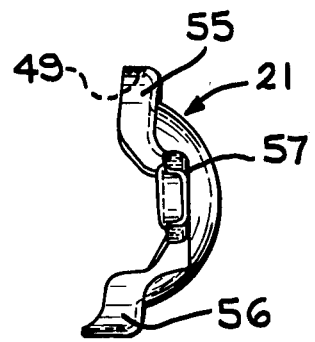
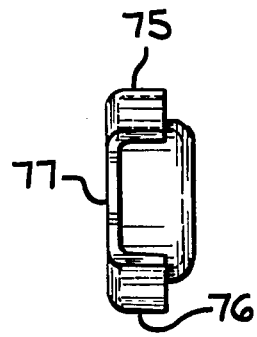
FIG. 9   FIG. 10
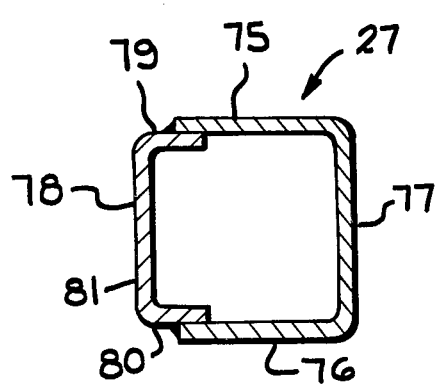
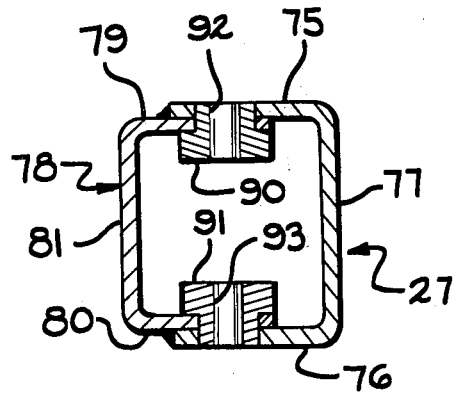
FIG. 11   FIG. 12

INTEGRAL SWING ARM

CROSS REFERENCE TO RELATED APPLICATION

This is a continuation of our prior, copending application Ser. No. 921,241, filed July 3, 1978, now abondoned.

This invention relates to vehicle suspension systems and more particularly to an improved independent suspension system for driven and non-driven front or rear wheels on a vehicle including dirigible wheels.

At present, there is a growing trend toward motor vehicles which have front wheel drive systems, either along or to supplement a rear wheel drive. If it is the front wheels that are propelling the vehicles, as well as steering it, it is desirable that each wheel be independently suspended from the other in order to maintain maximum road contact with the wheels. Independent suspension also is desirable for driven rear wheels of a vehicle, again to maintain a maximum road contact with the wheels. This criteria generally restricts the drive system to one of two general types. In the first type, the differential unit is rigidly attached to a vehicle frame or chassis and each axle and wheel assembly is independently suspended from the chassis. This configuration generally requires a large number of special parts which must rotate as well as cantilever and turn about a multiplicity of different axes for dirigible wheels. Also, this system is relatively expensive to manufacture and to maintain. In the second type of suspension system, the differential housing is pivoted from one arm on the vehicle chassis through a swing arm and one axle and wheel assembly is rigidly attached to the differential housing. The opposite wheel assembly is cantilevered from a separate point on the chassis. An example of this system is illustrated in U.S. Pat. No. 3,948,337. This design eliminates some of the manufacturing difficulties, but still requires a large number of pieces to be assembled into a single unit. For example, a tube or axle housing is pressed onto and doweled to the differential housing for mounting the one wheel assembly attached to the differential. Since the differential housing is load carrying, it had to be cast or fabricated from sufficiently strong materials and with sufficient thickness to prevent failure under various load conditions. As a consequence, the differential housing added considerable weight to the vehicle and to the suspension system. Another problem occurred when servicing the differential in this system. In order to remove the differential from the vehicle for maintenance, the swing arm connecting the housing to the frame had to be disconnected, which in turn released the entire wheel suspension and spring assembly.

According to the present invention, an improved suspension system is provided for independently mounting a front or rear pair of driven wheels on a vehicle. Each wheel assembly is mounted on an end of a separate swing arm formed from stamped metal. The opposite end of each swing arm is pivotally connected to the vehicle chassis. A differential housing is bolted to one of the swing arms and is connected through axle shafts to drive the wheels. An integral flange on the swing arm extends under a portion of the differential housing as a skid plate. Since the differential housing is not a significant structural portion of the suspension system, its weight can be reduced significantly over those used in prior art suspension systems and it can be cast or manufactured with reduced sections or from weaker or lighter metals. Furthermore, the differential can be removed from the vehicle for servicing without disconnecting the suspension system, as was required in prior art systems in which the differential housing formed a portion of the suspension system.

Accordingly, it is an object of the invention to provide an improved independent suspension system for vehicle wheels.

Another object of the invention is to provide an improved lighter weight independent suspension system for dirigible wheels on a vehicle.

Still another object of the invention is to provide an improved swing arm for mounting a wheel in a vehicle suspension system.

Other objects and advantages of the invention will become apparent from the following detailed description, with reference being made to the accompanying drawings.

FIG. 3 is a rear elevational view of the swing arm which mounts the differential housing;

FIG. 4 is a top plan view of the swing arm shown in FIG. 3;

FIG. 5 is a rear elevational view of the other swing arm for the suspension system of FIG. 1;

FIG. 6 is a top plan view of the swing arm of FIG. 5;

FIG. 7 is a cross sectional view taken along line 7-7 of FIG. 3;

FIG. 8 is a cross sectional view taken along line 8—8 of FIG. 3;

FIG. 9 is an end view of the swing arm of FIG. 3;

FIG. 10 is an end view of the swing arm shown in FIG. 5 and taken along line 10—10;

FIG. 11 is a cross sectional view taken along line 11—11 of FIG. 5; and

FIG. 12 is an optional cross sectional view taken along line 12—12 of FIG. 5 showing a method for mounting a reaction rod.

Figure 1:
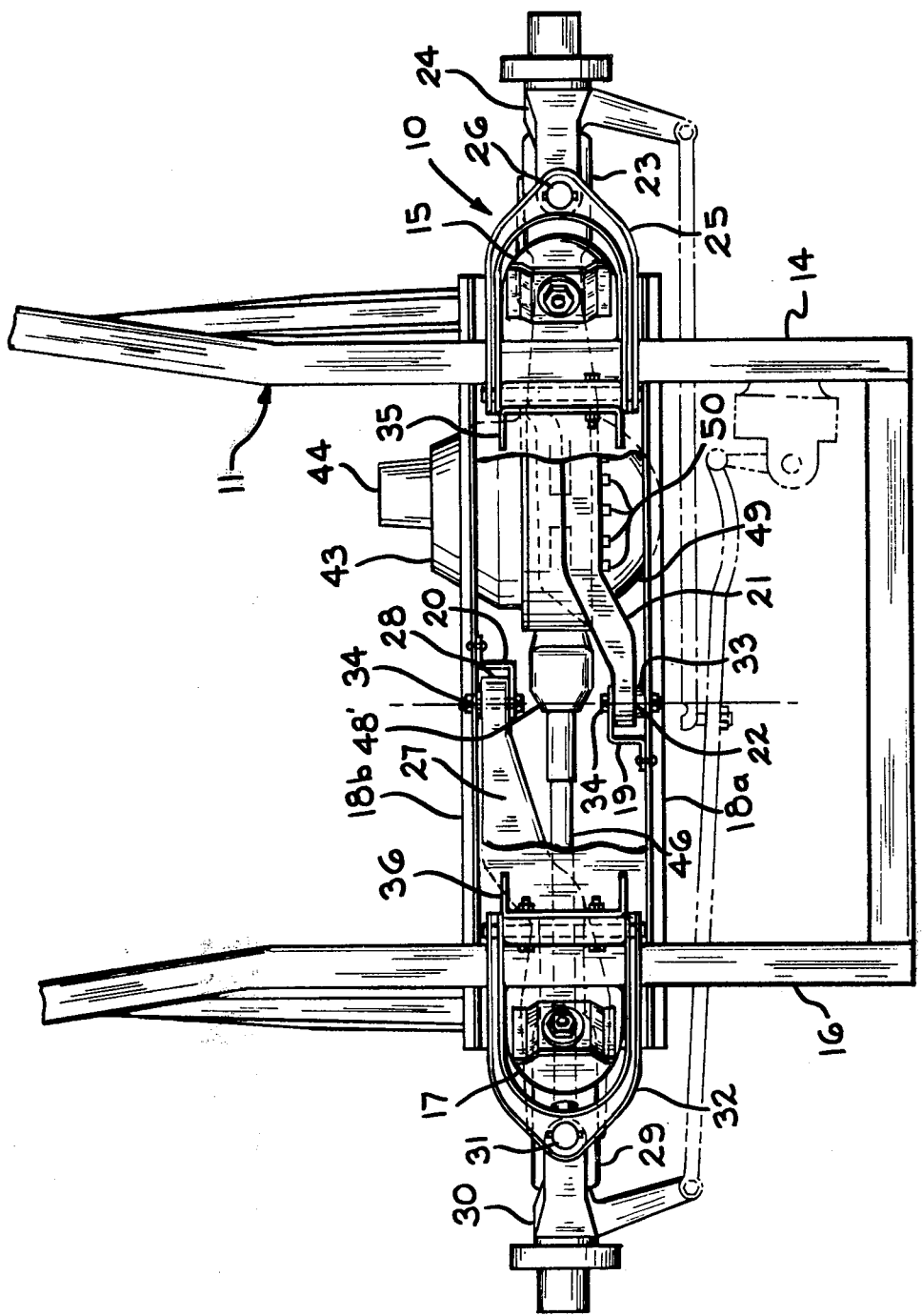
FIG. 1 is a fragmentary top plan view of the vehicle suspension system of the present invention connected to driven dirigible wheels.
Figure 2:
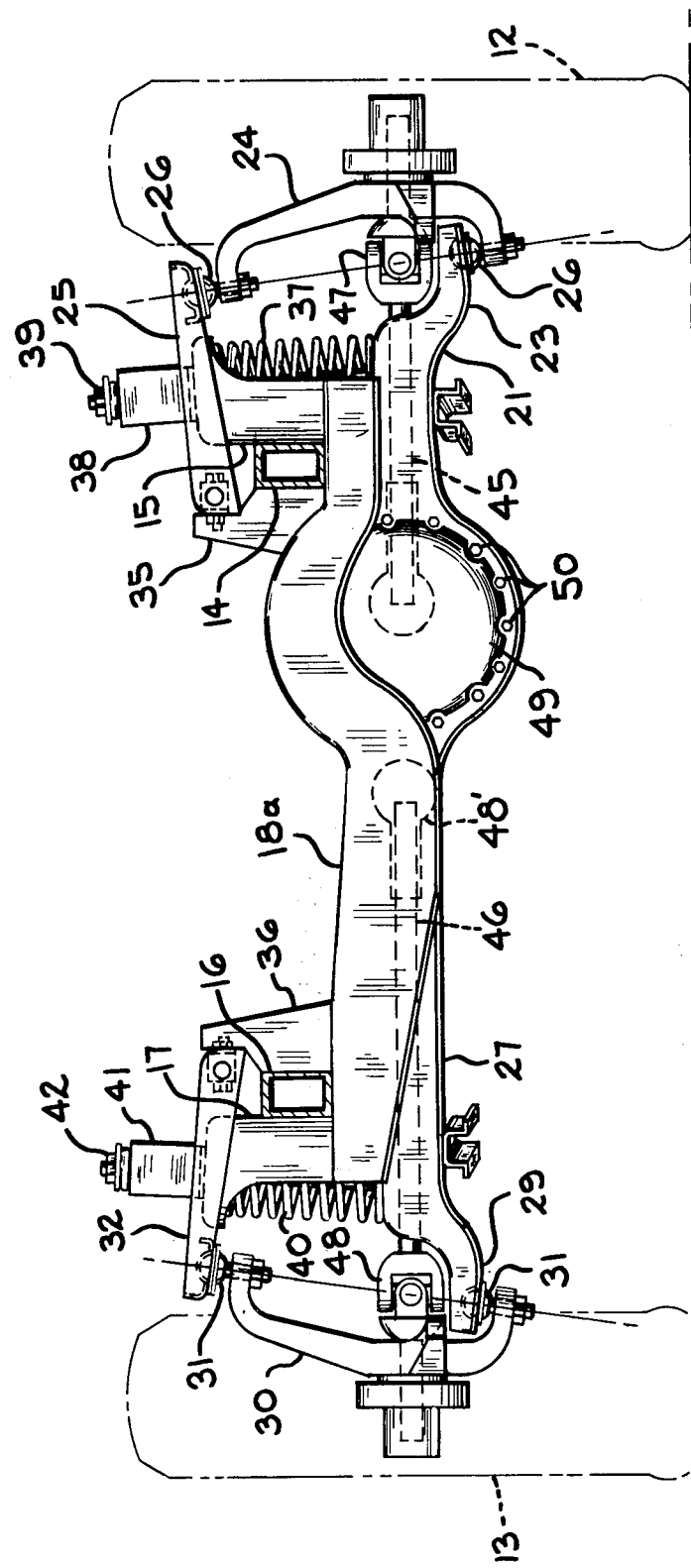
FIG. 2 is a fragmentary front elevational view of the suspension system shown in FIG. 1.

Turning now to the drawings and particularly to FIGS. 1 and 2, the independent suspension system 10 of the present invention is shown attached to a fragmentary portion of a vehicle chassis 11 for mounting a pair of driven dirigible wheels 12 and 13. The vehicle chassis 11 is of any conventional design and is illustrated herein as including a left frame rail 14 having a spring tower 15 attached thereto, a right frame rail 16 having a spring tower 17 attached thereto and two parallel cross members 18a and 18a rigidly interconnecting the rails 14 and 16 and the spring towers 15 and 17. Two brackets 19 and 20 shown, but not necessarily aligned, are mounted on and between the members 18a and 18b, respectively. However, it should be recognized that the illustrated chassis 11 is only exemplary and that the term "chassis" includes both a frame which is separate from a vehicle body and a unitized chassis having a body which also functions as a frame.

The suspension system 10 includes a left swing arm 21 which has an end 22 pivotally attached to the bracket 19 and a yolk end 23 attached to the left wheel 12 by steerable knuckle assembly 24 of conventional design. As used herein, "yoke" includes a half yoke as shown in FIGS. 1 and 2 or a full yoke. It should also be appreciated that the "yoke" end shape is a function of that suspension, and could be modified to suit ball joint or king pin arrangements as well as bearing supports for non-steerable applications. The remaining portion of the yoke includes a pivotal bracket 25. The knuckle assembly 24 is attached between the yoke end 23 and the bracket 25 at ball joints 26. Similarly, a right swing arm 27 has an end 28 pivotally attached to the bracket 20 and a yoke end 29 attached to the right wheel 13 by a steerable knuckle assembly 30 at a ball joint 31. A full yoke is formed by the yoke end 29 and a pivotal bracket 32 which also is connected to the knuckle assembly 30 with a ball joint 31. The ends 22 and 28 of the arms 21 and 27 are connected to the brackets 19 and 20, respectively, by bushings 33 and bolts 34 to permit the swing arms 21 and 27 to swing or pivot about the same axis.

Rearward movement of the swing arm 21 and attached wheel 12 is inhibited by a combination of structural elements including the members 18a and 18b and a bracket 35 to which the pivotal bracket 25 is mounted. Similarly, rearward movement of the swing arm 27 and attached wheel 13 is inhibited by the members 18a and 18b and a bracket 36 to which the pivotal bracket 32 is attached. The pivotal brackets 25 and 32 are pivotally attached to the brackets 35 and 36, respectively, to pivot about parallel axes which are also parallel to the frame rails 14 and 16 and the direction of movement of the vehicle in which the suspension system 10 is mounted. It should also be appreciated that rearward or forward movement of the swing arm 21 and 27 may also be restricted by other known structural members, such as by strut rods or reaction rods, as will be discussed in greater detail below.

A spring 37 is mounted within the spring tower 15 to extend between the left swing arm 21 and the spring tower 15 on the vehicle chassis 11. A bracket 38 extends above the spring tower 37. A conventional shock absorber (not shown) is positioned coaxially within the spring 37 to extend from the left swing arm 21 to the top of the bracket 38 where the shock absorber is anchored with a nut 39. Similarly, a spring 40 is positioned within the spring tower 17 to engage the right swing arm 27. A shock absorber (not shown) extends from the right swing arm 27 to a bracket 41 above the spring tower 17 where it is attached with a nut 42. As either of the wheels 12 or 13 is deflected upwardly, the attached swing arm 21 or 27 pivots abouts its end 22 or 28 to compress the spring, 37 or 40. This movement is dampened by the shock absorber in a conventional manner.

A differential gear including a differential gear housing 43 is mounted on the left swing arm 21. The differential gear housing 43 has an input 44 which is connected to a drive shaft in a conventional manner and has two outputs connected directly to a left axle shaft 45 and through a universal joint 48' to a right axle shaft 46. The left axle shaft 45 passes through the left swing arm 21 and is connected through a universal joint 47 and the knuckle assembly 24 to drive the left wheel 12 and the right axle shaft 46 passes from the differential and conventional universal joint 48' through the right swing arm 27 and is connected through a universal joint 48 and the knuckle assembly 30 to drive the right wheel 13. The universal joint 48' allows the axle shaft 46 to swing with respect to the differential 43 as the swing arm 27 pivots on the bracket 20. The swing arms 21 and 27 in part form axle housings for protecting the axle shafts 45 and 46, respectively. In addition, the swing arm 21 forms a mount for attaching the differential gear housing 43 through a plurality of bolts 50. A stamped region 49 on the swing arm 21 also encloses and seals one end of the differential gear housing 43. Since the differential gear housing 43 is not a major structural load carrying member in the suspension system 10, the weight of the differential gear housing 43 can be reduced considerably over prior art independent suspension systems in which the differential gear housing forms the major load carrying component in the system.

Referring now to FIGS. 3, 4, 7, 8 and 9 details are shown for the left swing arm 21. The left swing arm 21 is generally formed from a stamped sheet of steel and is shaped by stamping to include an upper flange 55, a lower flange 56 and an inner connecting web 57 extending between the flanges 55 and 56. At the end 22 of the swing arm 21, a cup shaped embossment 59 is formed in the web 57 for pivotal attachment to the bracket 19 on the vehicle chassis 11. A formed separate cup may be substituted for embossment 59. The embossment 59 has an opening 60 through which the bolt 34 passes to permit the swing arm 21 to pivot. At the yoke end 23 of the swing arm 21, a generally semi-spherical embossment 61 is formed to define a semi-spherical socket portion of the ball joint 26 which engages the knuckle assembly 24. It should be noted that the embossment 61 is dependent on the type knuckle used and therefore could be replaced by an inserted machined boss or bushing. In a central region 62 of the swing arm 21, the web 57 is enlarged and shaped to define the stamped portion 49 which encloses the end of the differential gear housing 43. A plurality of holes 63 are spaced in the web 57 about the stamped portion 49 for receiving the bolts 50 which engage the differential housing 43. Between the central region 62 and the yoke end 23, the swing arm 21 is reinforced with a U-shaped channel 64. The U-shaped channel 64 has an upper flange 65, a lower flange 66 and an interconnecting web 67. The flanges 65 and 66 are shaped and spaced apart to fit between and closely engage the spaced flanges 55 and 56, respectively, in the area between the central region 62 and the swing arm end 23. The channel 64 is positioned with the flanges 65 and 66 between the flanges 55 and 56 and the channel 64 is welded to the swing arm 21 to reinforce this region. When the channel 64 and the swing arm 21 are welded together, the web 67 is spaced from the web 57 to define an axle housing. The left axle shaft passes from the differential housing through this axle housing and through an opening 68 in the web 55 to engage the universal joint 47 and thence drive the wheel 12 mounted on the knuckle assembly 24. It should be noted that the flange 56 is wider within the central region 62 to extend at least partially below the differential housing 43 to protect the differential housing 43 from road hazards. It also should be noted that the integrity of the connection between the swing arm 21 and the differential housing 43 can be increased by bolting a flange 69 on the channel 64 directly to the differential gear housing 43 in addition to bolting the differential housing 43 to the web 57.

Turning now to FIGS. 5, 6, 10 and 12 details are shown for the right swing arm 27. The right swing arm 27 is generally in the form of a U-shaped channel having an upper flange 75 and a lower flange 76 interconnected by means of a central web 77. A U-shaped channel 78 extends a major portion of the distance between the ends 28 and 29 of the swing arm 27 to reinforce the swing arm 27. The U-shaped channel 78 includes an upper flange 79 and a lower flange 80 interconnected by a web 81. The flanges 79 and 80 are shaped and spaced apart to fit between and closely engage the flanges 75 and 76, respectively. The flanges 79 and 80 are positioned between the flanges 75 and 76 with the web 78 spaced from the web 77 to define an axle housing. The channel 78 is then welded to the flanges 75 and 76 to reinforce the right swing arm 27. An opening 82 is formed within the web 77 and an opening 83 is formed within the upper flange 75 to permit the right axle shaft 46 to pass through the axle housing defined by the right swing arm 27. The right axle shaft 46 passes through this axle housing from the differential gear housing 43 and is connected through the U-joint 48 and the knuckle assembly 30 to drive the right wheel 13. The right swing arm 27 also includes at the end 28 a cup-shaped embossment 84 having a central opening 85 for attachment to the bracket 20 on the vehicle chassis 11 by means of the bolt 34. At the end 29, the right swing arm 27 includes a semi-spherical embossment 86 in the lower flange 76 for cooperation with a ball on the knuckle assembly 30 to define the ball joint 31.

It should be noted that the suspension system shown in FIGS. 1-11, the left and right swing arms 21 and 27, respectively, have a yoke end which defines only half of the yoke which is attached to the knuckle assemblies which mount the dirigible wheels 12 and 13. In a modified embodiment of the invention, stamped metal swing arms are shaped with bifurcated ends for defining a full yoke for mounting a wheel.

It should be noted here that the load on the wheel 12 is transmitted through the swing arm 21 to the vehicle chassis. Since the load is not transferred through the differential housing 43, the differential housing 43 may be cast or otherwise fabricated with thinner wall thicknesses. In addition, materials other than cast iron may be considered for the differential housing. For example, aluminum is a possible material for fabricating the housing 43 since the housing 43 is not subjected to high forces. This further reduces the weight of the housing 43 and of the suspension system 10.

In the higher stress areas near the yolk end of the swing arm 27, for example, the upper and/or lower flanges 75 and 79 may overlap to provide a double metal thickness. As best seen in FIG. 12, an insert 90 may be positioned within the U-shaped channel 78 to extend through aligned openings in the flanges 75 and 79. Similarly, an insert 91 may be positioned within the channel 78 to extend through aligned openings in the flanges 76 and 80. The inserts 90 and 91 are provided with internally threaded openings 92 and 93, respectively. The threaded openings 92 and 93 may be used for bolting a bracket to the swing arm 27 for attachment of springs, shock absorbers, struts, and/or other suspension components. However, it should be appreciated that the inserts 90 and 91 may be omitted and that such other suspension components may be connected to the swing arm 27 by any conventional means, such as with a U-bolt which clamps around the outside of the swing arm 27 or with brackets welded to the swing arm 27.

It should be appreciated that only exemplary embodiments of the invention have been illustrated in the drawings. The described suspension systems may be readily modified, for example, by reversing the positions of the swing arms such that the differential housing is located on the right side of the vehicle rather than the left side. Two swing arms similar to the right swing arm 27 can be used for mounting a pair of wheels of a vehicle when neither of the wheels is driven. Also, the suspension system is adaptable to mounting driven or non-driven rear wheels on a vehicle. In this event, the wheel assemblies are fixed to the ends of the swing arms such that the wheels do not turn for steering. In addition to the specifically illustrated suspension system, it should be appreciated that the suspension system of the present invention is readily adaptable to different types of vehicle frames or chassis and for use with different suspension components, such as different types of springs, torsion bars, shock absorbers, and the like. However, in each of the different applications of the suspension system of the present invention, each swing arm and axle tube is formed as a complete element from stamped metal. The differential housing or carrier is not a major load carrying element in the suspension system and, therefore, a considerable weight reduction may be achieved and alternate materials may be used for the differential housing. Furthermore, the swing arm which mounts the differential housing may be provided with a lower flange which extends below the differential housing for protecting the less ductile housing from road obstacles by acting as a skid plate. The suspension system of the present invention allows for access and removal of the differential from the vehicle during servicing or replacement without removing the swing arm, the attached wheel assembly and the related suspension components.

The embodiments of the invention in which an exclusive property or privilege is claimed are defined as follows:

1. An independent wheel suspension system for a motor vehicle comprising: a vehicle chassis having left and right sides, a pair of opposing wheel assemblies including a driven left wheel and a driven right wheel, a left swing arm formed from stamped metal and extending substantially transverse said chassis, said left swing arm having a right end and left end means for attachment to said left wheel assembly, means pivotally connecting said right end to a point on said vehicle chassis, a right swing arm formed from stamped metal and extending substantially transverse said chassis, said right swing arm having a left end and right end means for attachment to said right wheel assembly, means pivotally connecting said left end to a point on said vehicle chassis, means for restraining said end means on said swing arms from forward and rearward movement with respect to said vehicle chassis, a differential having an input and two outputs, means detachably connecting said differential to one of said left and right swing arms, a first axle shaft connected to one of said differential outputs, end means on said first axle shaft for connecting said first axle shaft to drive the wheel on the wheel assembly attached to said one swing arm, a second axle shaft, a universal joint connecting the other differential output to said second axle shaft, end means on said second axle shaft for connecting said second axle shaft to drive the wheel on the wheel assembly attached to the other swing arm, left spring means connected between said left swing arm adjacent said left end means and said left side of said vehicle chassis, and right spring means connected between said right swing arm adjacent said right end means and said right side of said vehicle frame.

2. An independent wheel suspension system for a motor vehicle, as set forth in claim 1, and wherein said left and right wheels are dirigible wheels.

3. An independent suspension system for a motor vehicle, as set forth in claim 2, and wherein said one swing arm includes an integral lower protecting flange extending at least partially below said differential.

4. An independent wheel suspension system for a motor vehicle, as set forth in claim 1, wherein said left swing arm includes a generally U-shaped stamped metal first channel extending from said right end to said left end means, said first channel having a generally vertical first web interconnecting upper and lower first flanges, a U-shaped stamped metal second channel adjacent said left end means and having a generally vertical second web interconnecting upper and lower second flanges, and welding means connecting said first and second upper flanges and connecting said first and second lower flanges with said first and second webs spaced apart to define a tube for passing one of said axle shafts, and wherein said right swing arm includes a generally U-shaped stamped metal third channel extending from said left end to said right end means, said third channel having a generally vertical third web interconnecting upper and lower third flanges, a U-shaped stamped metal fourth channel adjacent said right end means and having a generally vertical fourth web interconnecting upper and lower fourth flanges, and welding means connecting said third and fourth upper flanges and connecting said third and fourth lower flanges with said third and fourth webs spaced apart to define a tube for passing one of said axle shafts.

5. A suspension for a driven wheel on a vehicle comprising a stamped metal swing arm having first and second ends, means for pivotally attaching said first end to such vehicle, means for mounting said wheel on said second end, a differential gear having a housing detachably mounted on said swing arm, and axle means for drivably connecting said differential gear to said mounted wheel.

6. The wheel suspension of claim 5, wherein said differential gear housing has an open end attached to said swing arm, and wherein said swing arm forms a fluid tight closure for said open end.

7. The wheel suspension of claim 5, wherein said swing arm has a generally U-shaped cross section between said differential housing and said second end, and further including reinforcement means attached to said swing arm between said differential housing and said second end, said swing arm and said reinforcing means forming an axle housing surrounding said axle means.

8. The wheel suspension of claim 5, and wherein said wheel mounting means includes yoke means on said second end for mounting a driven dirigible wheel.

9. A swing arm for a vehicle suspension system comprising: an integral stamped metal member having first and second ends; means for pivotally mounting said first member end to such vehicle; means on said member defining an axle housing portion adjacent said second end; and means on said member defining a differential gear housing portion between said axle housing portion and said mounting means.

10. A swing arm for a vehicle suspension system, as set forth in claim 9, wherein said member includes a stamped yoke at said second end.

11. A swing arm for a vehicle suspension system, as set forth in claim 9, wherein said member includes an integral stamped metal lower protecting flange extending at least partially below said differential gear housing portion.

12. A vehicle suspension system comprising: an integral stamped metal swing arm including means for pivoting said arm from a vehicle, a differential gear housing portion and an axle housing portion; and a differential gear case removably affixed to said differential gear housing portion, said differential gear case carrying substantially no vehicle load.

13. A vehicle suspension system, as set forth in claim 12, and further including means for removing said differential gear case from said differential gear housing portion without disconnecting other portions of said suspension system.

* * * * *